United States Patent [19]

Miller

[11] Patent Number: 4,607,921

[45] Date of Patent: Aug. 26, 1986

[54] WET MOUNT MICROSCOPIC EXAMINATION SLIDE II

[75] Inventor: Irvin E. Miller, Homewood, Ill.

[73] Assignee: V-Tech, Inc., Corona, Calif.

[21] Appl. No.: 529,142

[22] Filed: Sep. 7, 1983

Related U.S. Application Data

[63] Continuation-in-part of Ser. No. 420,270, Sep. 20, 1982.

[51] Int. Cl.⁴ .................... G01N 21/01; G02B 21/34
[52] U.S. Cl. .................................................... 350/536
[58] Field of Search ........................ 350/534, 535, 536

[56] References Cited

U.S. PATENT DOCUMENTS

| | | | |
|---|---|---|---|
| 2,039,219 | 4/1936 | Hausser et al. | 350/536 |
| 2,942,520 | 6/1960 | Rose | 350/536 |
| 3,572,892 | 3/1971 | Metzgar et al. | 350/536 |
| 3,777,283 | 12/1973 | Elkins | 350/536 |
| 3,961,346 | 6/1976 | White | 350/536 |
| 4,299,441 | 11/1981 | Parker | 350/536 |

FOREIGN PATENT DOCUMENTS 0057835 7/1891 Fed. Rep. of Germany ...... 350/529

Primary Examiner—John K. Corbin
Assistant Examiner—Vincent J. Lemmo
Attorney, Agent, or Firm—Drucker & Sommers

[57] ABSTRACT

A transparent laboratory slide for wet mount microscopic examination. A base member is formed with discrete platform surfaces or slide plates over which a cover slip is removably positioned. The fluid specimen to be examined is retained in the thin space between the platform surface and the cover slip by a capillary action. Peg and socket interconnecting means provide precise spacing between the platform and the cover slip. The platform surface is raised from the bottom wall of the base and the sides of the platform are opened to the external environment. This slide conveniently provides for low power and high power magnification as well as increased magnification by means of oil immersion.

20 Claims, 11 Drawing Figures

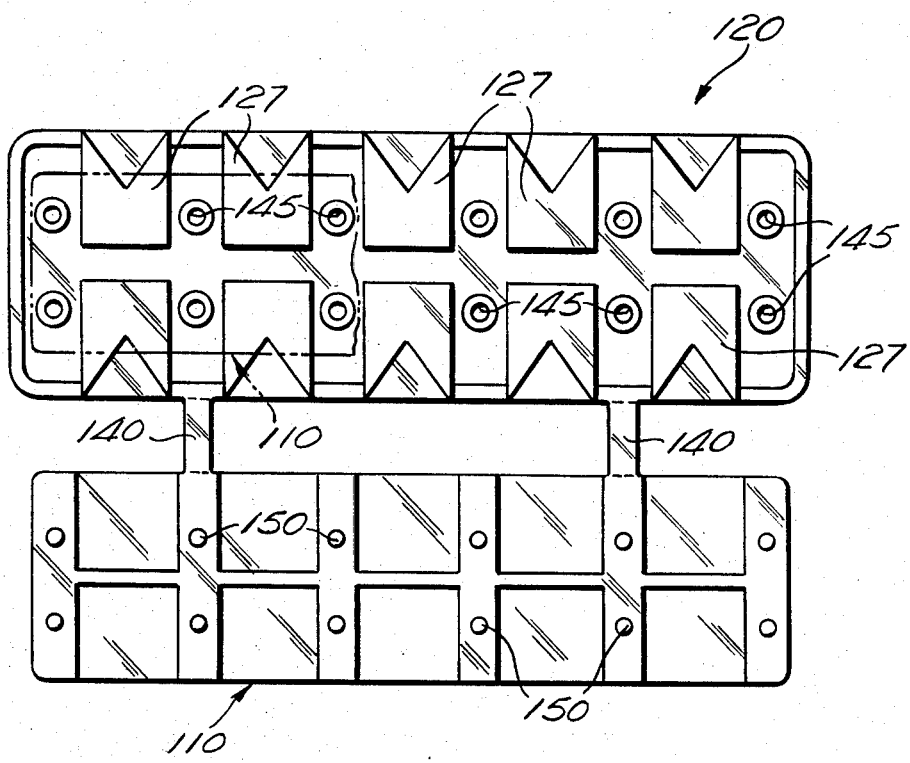
Fig. 5
Fig. 6

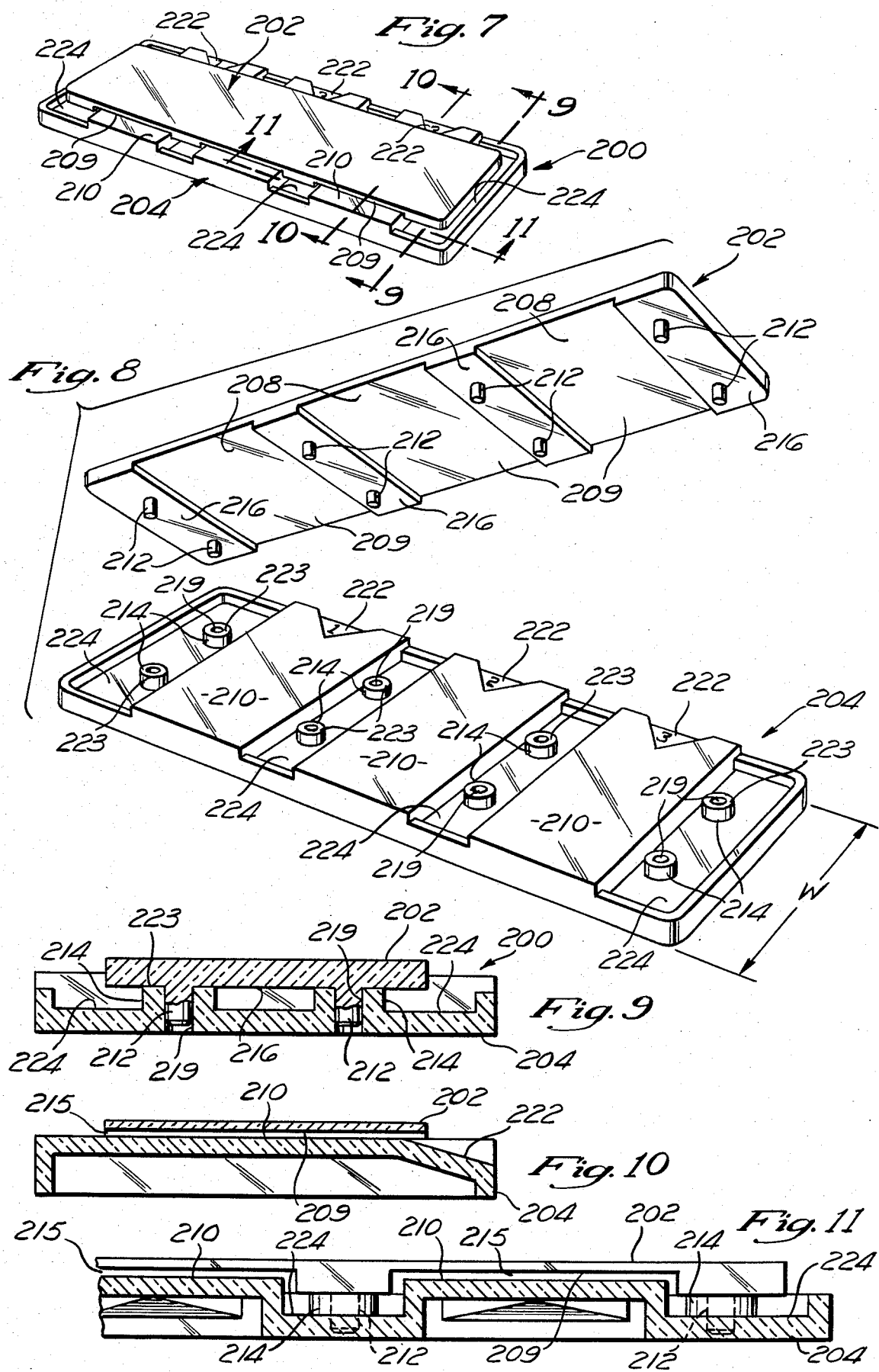

WET MOUNT MICROSCOPIC EXAMINATION SLIDE II

This application is a continuation-in-part of Ser. No. 420,270 filed on Sept. 20, 1982.

FIELD OF THE INVENTION

This invention relates generally to the examination of fluid specimens and more particularly to an improved transparent slide for receiving and retaining a thin film of a specimen before and during optical examination.

BACKGROUND OF THE INVENTION

A common means of preparing liquid specimens for microscopic examination has been to place a small quantity of the fluid on a flat, transparent slide plate and then placing a thin flat transparent cover slip over the specimen. The cover slip presses against the plate and spreads the fluid into a thin film in the space between the two elements. Thereafter, the liquid is retained in the space between the two elements by capillary action, that is, by the attraction of the liquid molecules for each other and for those of the solid materials forming the slide and cover slip. It is the space formed between the two elements in which sample specimens are retained that is hereinafter referred to as the capillary chamber. The thus prepared slide with the specimen is then placed on a microscope stage and is microscopically examined through the transparent cover slip.

One purpose for which a specimen so prepared is examined is to permit quantitative microscopic analysis of particulate matter in the fluid. Fluids which are typically examined by such procedures include urine, blood, spinal fluid, sputum and cell cultures. When the specimen has been spread to a film of generally uniform thickness, the technician is able to count the number of solid particulars, cells and the like in a given area of the specimen and this count is indicative of the content of the specimen per unit volume thereof. The actual volume of fluid confined beneath a given area of the cover slip is dependent upon several variables, among them being the size of the drop of liquid applied to the slide plate, the viscosity of the fluid, the force applied in squeezing the cover slip against the plate and the flatness of the two elements in their confronting relationship. The distribution of solid particles in the specimen, particularly larger particles, can be affected by the squeezing action, and slippage can occur between the cover slip and the plate, thereby possibly adversely affecting the accuracy of the examination. Because the thickness of sample depends on the amount of sample placed on the slide, as much as a 50-200% error can be introduced.

Wet mount slides of the type mentioned above have commonly been made of glass and normally a single specimen can be examined by one combination of plate and cover slip. Also, a relatively significant amount of dexterity, manipulation and skill is necessary to apply the specimen on the plate, place the cover slip thereon and handle the prepared slide until examination is completed. If an excess amount of the specimen is placed on the plate, it may be forced out of the space between the plate and the cover slip when they are positioned together. Removing the excess specimen without physically disturbing the position of two elements requires some skill. Furthermore, the entrapment of air between the plate and the cover slip can form undesirable bubbles which interfere with the accuracy of the examination. Another limitation of conventional wet mount slides has been the general impracticality of applying more than one specimen per slide. The contamination due to the intermixing of specimens is unavoidable where the spreading of the samples beneath the cover slip is uncontrolled. The cover slip also serves to protect the specimen from contamination by the technician, the objective of the microscope, and the environment.

The results of any analysis done by a technician are necessarily dependent on the skill and experience of that technician. For consistency, uniformity, and reproducability of results, it is important that sample sizes for a particular fluid be controlled both by the amount of specimen analyzed, and the depth of the capillary chamber for optimum accuracy.

Efforts have been made to provide unitary liquid specimen holders which overcome the disadvantages of the two-part slide mentioned above. Two of such examples of prior art are the U.S. Pat. No. issued to White, 3,961,346 and Elkins, U.S. Pat. No. 3,777,283 (referred to as the '346 White patent and the '283 Elkins patent, respectively). Both attempts have been less than completely satisfactory in dealing with the problems previously discussed. In the device of the '346 White patent, the two surfaces forming the capillary chamber are not parallel thereby resulting in a variation in the density of the particulate matter, depending upon the lateral position within the chamber. To deal with the problem of air bubble entrapment in the capillary chambers, the devices of the '346 White patent and '283 Elkins patent both make use of smoothly curved side walls to prevent any sharp corners where bubbles might collect. However, because both systems are closed systems, when the specimen is introduced into the chamber, undesirable air bubbles are often formed which are difficult to remove.

The devices in both the '346 White patent and '283 Elkins patent are one piece molded plastic devices with no possibility of adjustment of the thickness of the capillary chamber, that is, the spacing between the plate and cover slip. The capillary chambers of such slides can conveniently be molded with a spacing of 0.005 inch (0.127 mm) to about 0.015 inch (0.381 mm), and it has not been practical to directly mold a slide having smaller spacing, even though a thinner specimen chamber could at times be desirable.

The removal of excess sample remains a problem with both the inventions of the '346 White patent and '283 Elkins patent since both require manual manipulation and/or towelling off of the excess by the technician.

The U.S. Pat. No. 2,039,219 to Hausser discloses a wet mount examination slide wherein the slide plate, formed in a base member, is surrounded by overflow channels. The Hausser cover slip, however, has no positive interconnection means to the base member and, consequently, the relative and exact positioning of cover slip to plate surface is difficult to maintain while charging the examination chamber.

The present invention allows excess sample to flow freely out of the capillary chamber and into a trough on the slide while avoiding the problems inherent in Hausser.

SUMMARY OF THE INVENTION

Broadly speaking, this invention relates to a transparent laboratory slide which may be described as an open system wherein the capillary specimen chamber is open on all sides and wherein the two surfaces of the chamber are parallel, thereby facilitating an accurate count of the substance of interest in the fluid being examined.

The invention provides a multiple universal transparent slide apparatus formed with parallel plate and cover slip surfaces which may be precisely spaced by varying distances as desired to accommodate fluids of different viscosity, while obviating the bubble formation problem of known slides.

A base element is formed with a plurality of platforms having flat surfaces which perform the function of the slide plate of the previous two piece slide and cover slip combination. A V-shaped groove sloping away from the outward facing platform surface provides for introduction of the specimen fluid into the chamber, one side of which is the platform surface. A multiple element cover slip is adapted to removably attach to the base member and provide precise spacing as desired between the underside of each cover slip element and the corresponding platform surface. An open space is provided between parts of the cover slip and sides of the platform which raise the platform surface above the bottom wall of the base element so that each transparent slide is an open system wherein it is very unlikely that bubbles can form in the capillary chamber when the specimen is introduced into it. The releasable attaching means between the base and cover slip elements are preferably male and female peg and socket elements which fit together in such a way that with slight height or thickness changes in one of the elements, the chamber spacing may be made larger or smaller as desired for the particular fluid being examined.

The present invention may be distinguished from the closest prior art since it obviates the problem of air bubble entrapment since all four sides of the base element platforms are open to allow the escape of any air. The capillary chambers of this invention are uniquely characterized by this lack of side walls. Also, the raised platforms of the base element create troughs between the platforms where excess sample is free to overflow. The upper and lower surfaces of the capillary chambers are parallel to each other providing a uniform density for accurate inspection.

BRIEF DESCRIPTION OF THE DRAWINGS

The objects, advantages and features of this invention will be more readily apparent from a following detailed description when read in conjunction with the accompanying drawing, in which:

FIG. 5 is a plan view of a second embodiment of the base and cover slip members joined by a hinge means;

FIG. 6 is an end elevational view of the embodiment of FIG. 5;

FIG. 7 is a perspective view of a third embodiment of the base and cover slip members, in assembly, comprising the transparent slide of the present invention;

FIG. 8 is an exploded view of the third embodiment of transparent slide shown in FIG. 7; and FIGS. 9 to 11 are cross-sectional views of the assembled transparent slide, taken along the lines 9—9, 10—10 and 11—11 of FIG. 7, respectively.

DESCRIPTION OF THE PREFERRED EMBODIMENTS

Figure 1:
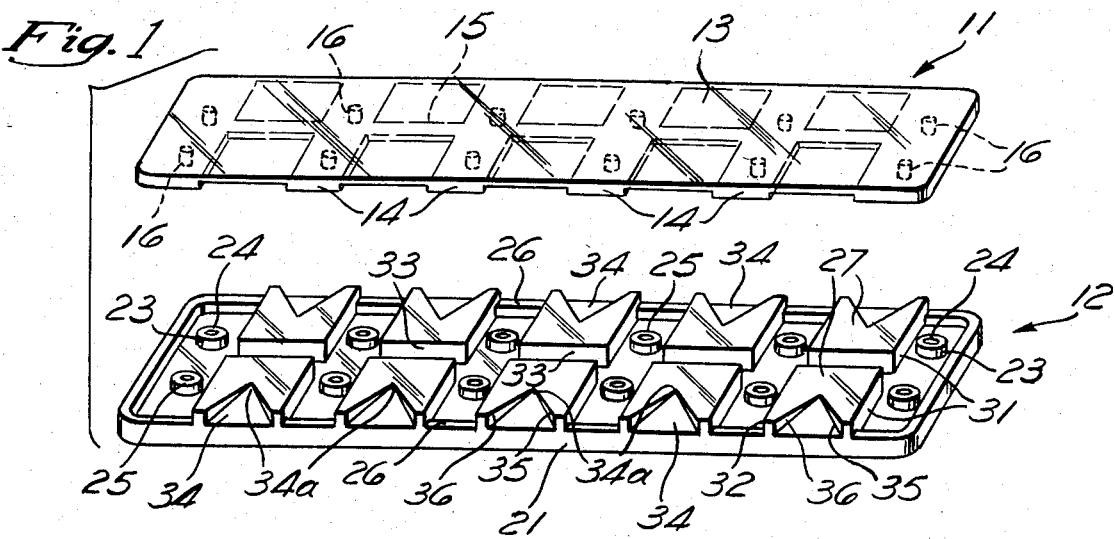
FIG. 1 is an exploded view of one embodiment of the base and cover slip members of the transparent slide of the present invention.

With reference now to the drawing, FIG. 1 shows cover member 11 in position above base member 12 for removable engagement therewith. The cover member 11 is formed with a plurality of cover slips 13 which are very thin, in the order of 0.004 inch (0.1 mm) to 0.0099 inch (0.25 mm). As shown in the drawing, cover slips 13 are spaced side by side longitudinally on the cover member 11, separated by supporting elements 14 which are substantially thicker than the cover slips and spaced from the lower surface of the cover slips by side walls 17. Cover slips 13 are positioned on opposite sides of the cover 11, separated by ribs 15 which are relatively narrow but typically of the same thickness as supporting elements 14. Pegs 16 extend downwardly from the supporting elements and provide part of the means for interconnecting the cover 11 with the base member 12.

Figure 2:
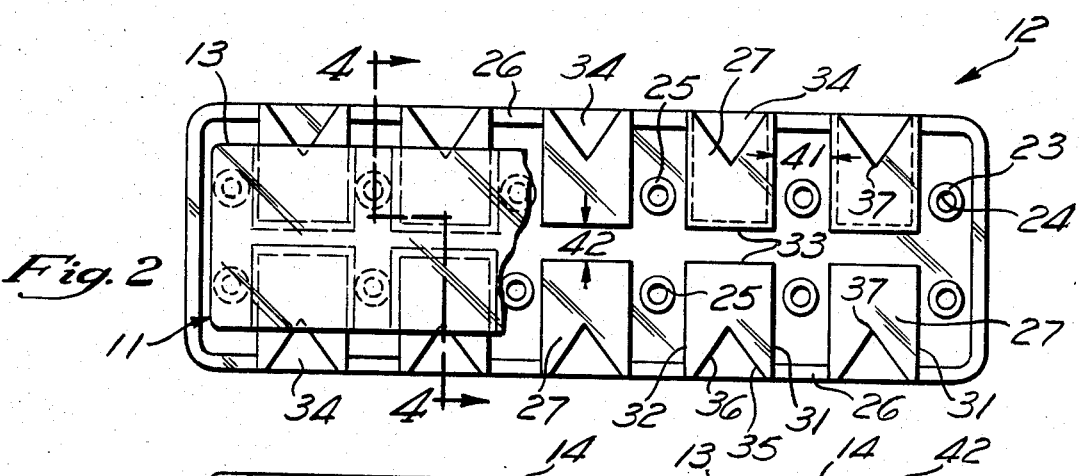
FIG. 2 is a top view of the slide of FIG. 1 with a portion of the cover slip broken away.
Figure 3:
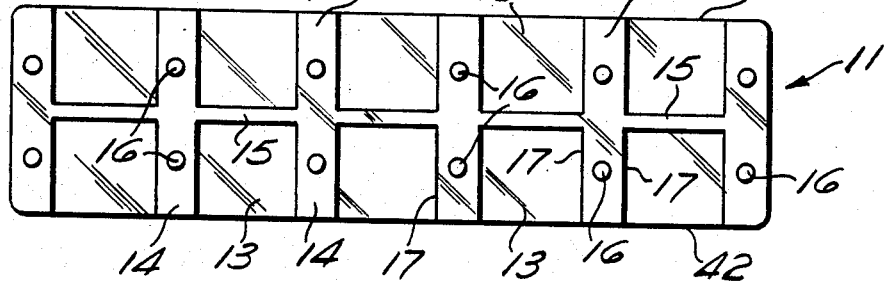
FIG. 3 is a bottom view of the cover slip of FIG. 1.
Figure 4:
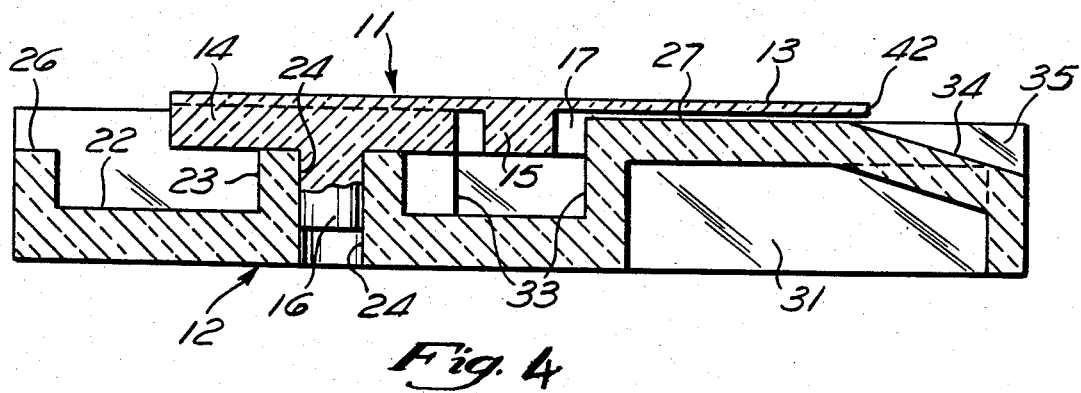
FIG. 4 is an enlarged sectional view taken along line 4—4 of FIG. 2.

Base member 12 is formed with a bottom wall 21 having an upper surface 22 and socket elements 23 projecting upwardly from surface 22. Sockets 23 are formed with holes 24 therein which are adapted to receive pegs 16 with supporting elements 14 resting on the top bearing surfaces 25 of the socket elements. The outside dimensions of bottom wall 21 are defined by edge 26 which completely surrounds the bottom wall and functions as a stiffening element for the base member 12. The base member 12 is also formed with a plurality of platform surfaces or slide plates 27 spaced above upper surface 22 of the bottom wall by means of vertical walls 31, 32 and 33. Communicating with plate 27 is fluid receiving surface 34 which is triangularly shaped and slopes away from the plate as is shown clearly in FIGS. 1 and 4. Each fluid receiving surface 34 is defined by walls 35 and 36 which, together with fluid receiving surface 34 further defines the fluid receiving groove or passage 37. It should be noted that the inner ends of walls 35 and 36 do not meet because the surfaces 27 and 34 are continuous through narrow passage 37 (FIG. 2).

When the laboratory slide of this invention is to be used, cover element 11 is mounted to base 12, pegs 16 frictionally engaging holes 24 in socket elements 23 with supporting surfaces 14 resting upon rim 25 of the sockets. In this position, the bottom of cover slips 13 are spaced above plates 27 by a predetermined distance. That spacing is preferably in the range of 0.001 inch (0.0254 mm) and 0.004 inch (0.1 mm), but the structure is not so limited. This spacing constitutes a capillary specimen chamber wherein fluid to be examined is retained between the cover slip and the platform surface by capillary action of that fluid. Thus the spacing may be that which is appropriate for any particular fluid. The base and cover slip members are so constructed that the distance 41 (FIG. 2) between adjacent plates is greater than the width of supporting elements 14 of the cover member and the spacing 42 between opposite plates is greater than the width of ribs 15. With this construction, it is readily apparent that the laboratory slide of this invention is an open system whereby all sides of the plate communicate with the external environment and there is no possibility of air being trapped within the capillary chamber when fluid is introduced therein.

As has been alluded to above, because fluids to be microscopically examined differ significantly in their viscosity, it is often desirable to employ laboratory slides where the capillary chambers are not all of the same spacing. By means of the present structure, it is possible to provide slides which are suited to specific fluids without any change in the principles of the invention. One means for providing a different capillary chamber spacing is to increase or decrease the height of socket elements 23. From FIG. 4 it is apparent that an increase in height of the socket element 23, without any change in the cover member 11, will increase the spacing between cover slip 13 and plate 27 to accommodate a fluid of greater viscosity. Conversely, shortened socket element 23 will narrow the capillary chamber for lower viscosity fluids. Alternately, the thickness of support surface 14 can be increased or decreased with the same effect. It should be noted that only one of the two members, the base member or the cover member, need to be formed with elements of different sizes to change the capillary chamber thickness. The other member can be standard for all examination purposes. Another means by which to provide different capillary chamber spacing is to make holes 24 blind and varying the length of pegs 16. In that event, making the pegs longer would increase the chamber spacing and supporting elements 14 would not necessarily rest upon the tops of sockets 23.

One simple interconnecting means, a peg and socket combination, are shown and described. However, there are many other interconnecting means which could be used to provide the desired releasable retention between the two members, together with flexibility as to the capillary chamber spacing.

In accordance with known microscopic examination techniques, the laboratory slide of this invention provides both low power with a magnification factor of about 10 and high power with a magnification of 45 to 55. It is also possible to employ the slide of this invention for oil immersion whereby the magnification factor can be increased to 100. As is well known, the cover slip protects the objective of the microscope from becoming contaminated by contact with the fluid being examined. In the same way that it provides protection for the microscope and the fluid, it can support a drop of oil into which the objective can be placed for increased magnification without contaminating either the objective or the fluid under examination. Because of the fact that the cover slip of this laboratory slide can be made very thin, its optical characteristics are excellent and generally better than those of the one piece molded slides previously available.

When the laboratory slide of this invention is to be used for examination of fluids, and the base member and cover elements have been secured together, it may be seen that the outer edge 42 of the cover slip extends slightly over the narrow portion of fluid receiving surface 34 where it communicates through passage 37 with plate surface 27. It should be noted that the fluid receiving surface may have various shapes but preferably is triangular so that its innermost apex 34a serves as a locator for a pipette end; the fluid receiving surface 34 communicates with plate 27 and is configured as to facilitate fluid migration into the specimen chamber by capillary action. With reference to FIG. 2, the slide should be tilted to a somewhat vertical position so that fluid receiving areas on one side open upward. A drop of fluid placed in one fluid receiving area will migrate by capillary action into the capillary chamber beneath cover slip 13 and on top of plate surface 27 and the air which is normally between these two surfaces can escape in any direction from between them.

Several different specimens may be placed in the laboratory slide, one specimen in each of the numbered areas so that several may be examined on one laboratory slide. Upon completion of the examination of the fluids in the specimen chambers, the slide may be disposed of. For indexing purposes the numerals may be provided on the under side of fluid receiving surface 34, but that convenience is not necessary. Although users normally find the multiple slide arrangement to be desirable, it is possible that some people would want a single or possibly a dual slide configuration. This invention is not limited to any particular number of slides.

It should be noted that the capillary chamber can be made with any desired spacing between the plate and the cover slip and is not limited by the molding process as is true of some of the prior art devices. By fabricating the plate and cover slip separately, the spacing of the capillary chamber can be made significantly thinner than those of prior art, thus allowing a single layer of specimen to be viewed. This structure enhances the accuracy of examinations made. When the fluid is placed in a chamber, excess fluid can be conveniently removed by tilting the slide and allowing such excess to fall off. The liquid in the capillary chamber will be retained therein by capillary action.

The material of both elements of the slide of this invention is preferably plastic, being optically transparent, having the desired degree of wettability and can be conveniently injection molded. Examples of plastics which are satisfactory for this purpose include cellulose ester compositions such as cellulose acetate and cellulose acetate butyrate. A number of other plastics could also be satisfactory.

Referring now to FIGS. 5 and 6, the base 120 and cover members 110 could be molded as a single integral piece with a plastic hinge 140 between them. In this way, the elements would never become separated from one another and the cover element 110 could easily be folded over onto the base member 120 so that the pegs 150 engage the socket elements 145.

Although hinges of simple strips of plastic could be affixed along either the long or short sides of the slide and cover slip, for accuracy of fabrication, it is presently preferred to place the hinges 140 along the long edges in order to reduce tooling costs.

The embodiment of FIGS. 5 and 6 is particularly useful in an application of the present invention wherein specimens are placed on the plate surface 127 and the hinged cover slip 110 is attached. This application is of particular usefulness in instances such as those that arise in the field of bacteriology (i.e. in testing for gonorrhea) where a series of stains must be applied to a specimen before microscopic viewing.

Grid marks or lines to indicate different examination fields might be incorporated in the fabrication of the cover or base member. A portion of the slide might be formed of frosted plastic for application of indicia for identification purposes.

In the third embodiment of this invention, shown in FIGS. 7–11, the examination areas defined by the plurality of plate surfaces and confronting cover slips, are each substantially coextensive with the width W of the transparent slide. That is to say, each examination area is over twice as large, in area, as the first and second embodiments heretofore described in FIGS. 1-6—even though the overall width of the transparent slide in the third embodiment of FIGS. 7-11 is the same as that of the FIGS. 1-6 embodiments. The enlarged examination area is especially suitable in the examination of specimens requiring larger examination areas such as parasites in stool samples and monoclonal antibodies in blood plasma.

More particularly, the slide of the FIGS. 7-11 embodiment is designated generally by the numeral 200. The cover member is designated by the numeral 202 and the base member as 204.

The cover member is formed with a plurality of cover slips 208, each having a lower surface 209 located in spaced confronting relationship to a plurality of plate surfaces 210 in the base member 204 when the cover and base members 202, 204 are assembled by respective first and second complementary post (or peg) and socket interconnecting means 212, 214.

The post and socket interconnecting means 212, 214 removably interconnect, or attach, the cover and base members 202, 204. In the interconnected position (i.e., the fully assembled position shown in FIGS. 7 and 9-11), the cover slips 209 are spaced a predetermined distance 215 from the plate surfaces 210, the spacing 215 between plate surface 209 and cover slip 210 (preferably about 0.0254 mm to 0.1 mm) being reproducibly achieved by means of predetermining the dimensions of the thickness of supporting surfaces 216 which separate cover slips 208, and/or the height of sockets 214. Thus, when the supporting surfaces 216 lie in abutment with the top rim 223 of the sockets 214 (the pegs or posts 212 frictionally engaging the holes 219 of the sockets 214, as described with reference to the FIGS. 1-5 embodiment), the spacing 215 is predetermined to very close tolerances. When either of the socket height or thickness of supporting surface 216 is changed, spacing 215 will be varied.

Each plate surface 209 has a fluid receiving surface 222 shaped in the same manner as described with reference to FIGS. 1-5. The supporting surfaces 216 are formed on opposite sides of cover slips 208 and extend below the cover slip lower surface 209 (see FIG. 11).

The cover member 202 does not have a rib element as in FIGS. 1-5 since the cover slips 209 extend entirely from side to side of the cover member 202 and together with plate surfaces 210 (which also extend entirely from side to side of base member 204—except for fluid receiving area 222) define an examination area over twice the size of the examination area of the FIGS. 1-5 embodiment.

It is to be noted that in the third embodiment of this invention, the examination chamber is open along all sides, as in the FIGS. 1-5 embodiment, so that excess fluid deposited in an examination chamber may overflow into side channels 224. This third embodiment is thus an open system as with the FIGS. 1-5 embodiment. In the FIGS. 1-5 embodiment, however, the overflow fluid can be deposited not only into side channels, but into an end channel, defined by vertical walls 33, as well.

I claim:

1. A dual member transparent laboratory slide consisting of:
   a base member having a bottom wall with an upper surface, said base member being integrally formed with at least one plate surface spaced above said upper surface, a fluid receiving surface communicating with said plate surface, and a first interconnecting means;
   a cover member formed with at least one cover slip having a lower surface adapted to be located in spaced confronting parallel relationship with respect to said plate surface, said cover member being integrally formed with second interconnecting means complementary with said first interconnecting means, said first and second interconnecting means being adapted to removably attach said cover member to said base member; and
   said first and second interconnecting means being adapted to be shaped and configured to selectively provide a predetermined spacing between said plate surface and said cover slip to thereby form a capillary chamber therebetween of selectably predetermined spacing, and also providing substantially rigid positioning of said cover slip and plate surface against lateral movement, said capillary chamber being open on all sides and wherein said cover slip covers only a portion of said fluid receiving surface where it communicates with said plate surface.

2. The laboratory slide recited in claim 1 wherein:
   said fluid receiving surface is a flat triangularly shaped surface depressed from said plate surface and opening toward the outside edge of said base member.

3. The laboratory slide recited in claim 1 wherein:
   said first interconnecting means comprises at least one socket element extending upwardly from said upper surface and having a hole therein; and
   said second interconnecting means comprises at least one peg projecting downwardly from said cover member, said peg being removably frictionally receivable in said hole in said socket element.

4. The laboratory slide recited in claim 3 wherein:
   the bottom of said hole is closed, and the spacing between said cover slip and said plate surface is varied by changing the length of said peg.

5. The laboratory slide recited in claim 3 wherein:
   the predetermined spacing between said cover slip and said plate surface is varied by changing the height of said socket element above said upper surface, wherein said supporting element rests on the top of said socket element.

6. The laboratory slide recited in claim 1 wherein:
   said cover member is formed with supporting elements on opposite sides of each said cover slip, and said supporting elements are spaced below said lower surface.

7. The laboratory slide recited in claim 6 wherein:
   the predetermined spacing between said cover slip and said plate surface may be varied by changing the thickness of said spacing elements.

8. The laboratory slide recited in claim 6 wherein:
   each plate surface and each confronting cover slip lower surface extends substantially the entire width of the laboratory slide for maximum viewing.

9. The laboratory slide recited in claim 1 wherein:
   said cover member is formed with supporting elements on opposite sides of each said cover slip, said supporting elements are spaced below said lower surface, and a rib element interconnects said supporting elements and extends downwardly from said cover slip.

10. The laboratory slide recited in claim 1 wherein:

the predetermined spacing between said cover slip and said plate surface may be varied by changing the height of one of said interconnecting means.

11. The laboratory slide recited in claim 1 wherein: the spacing between said cover slip and said plate surfaces ranges between about 0.0254 mm and about 0.1 mm.

12. The laboratory slide recited in claim 1 wherein: said cover member and said base member are hingeably attached to each other.

13. The laboratory slide recited in claim 1 wherein: each plate surface and each confronting cover slip lower surface extends substantially the entire width of the laboratory slide for maximum viewing.

14. The laboratory slide recited in claim 13 wherein: said fluid receiving surface is a flat triangularly shaped surface depressed from said plate surface and opening toward the outside edge of said base member.

15. The laboratory slide recited in claim 13 wherein: said cover member is formed with supporting elements on opposite sides of each said cover slip, and said supporting elements are spaced below said lower surface; and the predetermined spacing between said cover slip and said plate surface may be varied by changing the thickness of said supporting elements.

16. The laboratory slide recited in claim 13 wherein: the spacing between said cover slip and said plate surfaces ranges between about 0.0254 mm and about 0.1 mm.

17. The laboratory slide recited in claim 13 wherein: said cover member and said base member are hingeably attached to each other.

18. The labroatory slide recited in claim 13 wherein: said first interconnecting means comprises at least one socket element extending upwardly from said upper surface and having a hole therein; and said second interconnecting means comprises at least one peg projecting downwardly from said cover member, said peg being removably frictionally receivable in said hole in said sock element.

19. The laboratory slide recited in claim 18 wherein: the bottom of said hole is closed, the spacing between said cover slip and said plate surface may be varied by changing the length of said peg.

20. The laboratory slide recited in claim 1 wherein: the predetermined spacing between said cover slip and said plate surface is varied by changing the height of one of said interconnecting means.

* * * * *